United States Patent
Nagata et al.

(10) Patent No.: US 9,414,251 B2
(45) Date of Patent: Aug. 9, 2016

(54) METHOD FOR DETERMINING MULTI-USER CHANNEL QUALITY IN MOBILE COMMUNICATION SYSTEM, AND USER TERMINAL AND BASE STATION THEREFOR

(75) Inventors: Satoshi Nagata, Tokyo (JP); Yang Song, Beijing (CN); Xiaoming She, Beijing (CN); Lan Chen, Beijing (CN)

(73) Assignee: NTT DOCOMO, Inc., Tokyo (JP)

( * ) Notice: Subject to any disclaimer, the term of this patent is extended or adjusted under 35 U.S.C. 154(b) by 280 days.

(21) Appl. No.: 14/112,272

(22) PCT Filed: Apr. 20, 2012

(86) PCT No.: PCT/JP2012/060765
§ 371 (c)(1),
(2), (4) Date: Jan. 29, 2014

(87) PCT Pub. No.: WO2012/144621
PCT Pub. Date: Oct. 26, 2012

(65) Prior Publication Data
US 2014/0133334 A1    May 15, 2014

(30) Foreign Application Priority Data

Apr. 22, 2011 (CN) .......................... 2011 1 0111665

(51) Int. Cl.
*H04J 1/16* (2006.01)
*H04W 24/10* (2009.01)
*H04B 7/04* (2006.01)
*H04L 1/00* (2006.01)
*H04B 17/24* (2015.01)
*H04B 7/06* (2006.01)

(52) U.S. Cl.
CPC ............. *H04W 24/10* (2013.01); *H04B 7/0452* (2013.01); *H04B 17/24* (2015.01); *H04L 1/003* (2013.01); *H04L 1/0025* (2013.01); *H04B 7/0632* (2013.01); *H04B 7/0636* (2013.01)

(58) Field of Classification Search
CPC .. H04B 7/0452; H04B 7/0632; H04B 7/0636; H04B 17/24; H04L 1/003; H04W 24/00
See application file for complete search history.

(56) References Cited

U.S. PATENT DOCUMENTS

| | | | | |
|---|---|---|---|---|
| 2012/0087435 A1* | 4/2012 | Gomadam | ........... | H04B 7/0452 375/285 |
| 2012/0314787 A1* | 12/2012 | Park | ..................... | H04B 7/0417 375/260 |
| 2013/0308488 A1* | 11/2013 | Tong | .................... | H04B 7/0452 370/252 |

OTHER PUBLICATIONS

International Search Report for corresponding International Application No. PCT/JP2012/060765, mailed Jul. 10, 2012 (1 page).

*Primary Examiner* — Kan Yuen
(74) *Attorney, Agent, or Firm* — Osha Liang LLP

(57) ABSTRACT

Provided are a method for determining multi-user channel quality in a mobile communication system, a user terminal and a base station of the present invention. The method includes: in each user terminal, calculating the MU CQIs based on a first feedback template notified from a base station that has control over the user terminal or a second feedback template set by the user terminal and feeding the MU CQIs back to the base station. In the first feedback template or the second feedback template, a feedback ratio of MU CQIs for a plurality of hypothetical interference numbers k are defined, k being an integer larger than 0 and smaller than a maximum number of users schedulable by the base station. According to the present invention, it is possible to improve the accuracy in multi-user MIMO scheduling.

26 Claims, 5 Drawing Sheets

METHOD FOR DETERMINING MULTI-USER CHANNEL QUALITY IN MOBILE COMMUNICATION SYSTEM, AND USER TERMINAL AND BASE STATION THEREFOR

TECHNICAL FIELD

The present invention relates to a mobile communication field, and particularly, to a method for determining multi-user channel quality, a user terminal and a base station.

BACKGROUND ART

In a conventional Rel.8 downlink multiple-input multiple-output (MIMO) system, a user terminal (UE) feeds back a precoding matrix index (PMI: Precoding Matrix Indicator) selected with the assumption of single user MIMO and a calculated channel quality indicator (CQI). When performing multi-user scheduling, inter-user interference between plural users scheduled by the same base station is not considered in single user channel quality (SU CQI), and therefore, there is a great difference between the fed-back SU CQI and a CQI which is used in performing multi-user transmission finally. Accordingly, if multi-user channel quality (MU CQI) considering multi-user interference is fed back additionally, it makes a great contribution to improvement of accuracy in multi-user MIMO scheduling. As a matter to be explained, the base station can be specifically embodied as so-called eNodeB (eNB).

SUMMARY OF THE INVENTION

Technical Problem

However, in an actual system, UE apparatus cannot predict the scheduling result of eNB and therefore, cannot estimate the MU CQI considering multi-user interference well. Accordingly, in MU CQI calculation in the conventional technique, it is generally necessary to make some hypothesis about interference.

For example, in the MU CQI calculation method presented in R1-105801, it is assumed in multi-user MIMO transmission that the rank of each UE apparatus is 1 (that is, the number of data layers to be transmitted to each UE apparatus is 1) and the number of total layers or the number of data streams is 4. Therefore, precoding vectors for rank 1 selected for each UE apparatus include three precoding vectors orthogonal to each other as interference. However, this method is based on the hypothesis that there are always three interferences for each UE apparatus, and therefore, this method is relatively pessimistic.

For example, in a method proposed by Pantech Co., Ltd., UE apparatus is required to feed back an average of MU CQIs for all available numbers k of hypothetical interferences (hypothetical interference number). The hypothetical interference number is greater than 0 and smaller than a maximum number of users to be schedulable by the base station. For example, when the maximum number of users to be schedulable by the base station is 4, the hypothetical interference number is any one of 1 to 3. However, the average is highly-possibly different from the MU CQI on any interference hypothesis.

Further, for example, in a method proposed by NEC Corporation, eNB quasi-statically designates a hypothetical interference number to be used in calculating an MU CQI and notifies the UE apparatus. With this method, downlink signaling overhead is required to some degree and the MU CQI fed back from the UE apparatus is based on only one interference hypothesis, which may affect accuracy of the scheduling result.

In other words, MU CQIs determined in the conventional techniques have respective problems, which all affect the accuracy of multi-user MIMO scheduling.

The present invention provides a method for determining multi-user channel quality in a mobile communication system, a user terminal and a base station, all capable of improving the accuracy of multi-user MIMO scheduling.

Solution to Problem

The present invention provides a method for determining multi-user channel quality (MU CQI) in a mobile communication system.

The method is characterized by comprising: in each user terminal, calculating the MU CQIs based on a first feedback template notified from a base station that has control over the user terminal or a second feedback template set by the user terminal and feeding the MU CQIs back to the base station, wherein in the first feedback template or the second feedback template, a feedback ratio of MU CQIs for a plurality of hypothetical interference numbers k are defined, k being an integer larger than 0 and smaller than a maximum number of users schedulable by the base station.

In the step of, in the user terminal, calculating the MU CQIs and feeding the MU CQIs back to the base station, the user terminal calculates the MU CQIs for the respective hypothetical interference numbers k defined in the first feedback template or the second feedback template and feeds the MU CQIs back to the base station in time and/or frequency based on the feedback ratio.

In transmitting the MU CQIs in the time and/or frequency based on the feedback ratio, P time-domain feedback subframes is set as one time cycle, a number of time-domain feedback subframes occupied by an MU CQI of each of the hypothetical interference numbers k is determined based on the feedback ratio, and in each time cycle, the MU CQI of the hypothetical interference number k is transmitted using a corresponding number of time-domain feedback subframes.

In transmitting the MU CQIs in the time and/or frequency based on the feedback ratio, a frequency bandwidth of the mobile communication system is divided into M frequency-domain feedback subbands, a number of frequency-domain feedback subbands occupied by an MU CQI of each of the hypothetical interference numbers k is determined based on the feedback ratio, and the MU CQI of the hypothetical interference number k is transmitted using a corresponding number of frequency-domain feedback subbands.

In transmitting the MU CQIs in the time and/or frequency based on the feedback ratio, a frequency bandwidth of the mobile communication system is divided into M frequency-domain feedback subbands, P time-domain feedback subframes is set as one time cycle, a number of pairs of a time-domain feedback subframe and a frequency-domain feedback subband occupied by an MU CQI of each of the hypothetical interference numbers k is determined based on the feedback ratio, and the MU CQI of the hypothetical interference number k is transmitted using a corresponding number of pairs of the time-domain feedback subframe and the frequency-domain feedback subband.

The user terminal calculates the MU CQIs based on the second feedback template set by the user terminal and feeds the MU CQIs back to the base station, and the base station uses MU CQIs fed back from one or plural user terminals as a basis to perform multi-user multiple-input multiple-output scheduling, and selects the first feedback template for the user terminal.

The user terminals under control of the base station use a same second feedback template.

The user terminal selects the second feedback template based on a current signal to interference noise ratio of the user terminal in feeding back the MU CQIs, when the signal to interference noise ratio is larger than a first threshold, a feedback rate of an MU CQI of any relatively large hypothetical interference number k is relatively large in the selected second feedback template, and when the signal to interference noise ratio is smaller than the first threshold, a feedback rate of an MU CQI of any relatively small hypothetical interference number k is relatively large in the selected second feedback template.

In selecting the first feedback template for the user terminal, the base station determines a number i of other users scheduled simultaneously with the user terminal in a pre-set history time window, determines a probability of occurrence of the number i of other users scheduled simultaneously in the history time window and determines the first feedback template based on the probability of occurrence.

The probability of occurrence of the number i of other users scheduled simultaneously in the history time window is determined by accumulating occurrence frequencies of the number i of other users scheduled simultaneously in the history time window, or by determining a weighing ratio $w_i(n)$ of the number i of other users scheduled simultaneously in a time-domain scheduling subframe n based on an expression:

$$w_i(n) = (1-\alpha)w_i(n-1) + \alpha \cdot \Sigma_m Q_i(n,m), \quad \text{[FORMULA 1]}$$

where $Q_i(n,m)$ is a scheduling result in the time-domain scheduling subframe n and a frequency-domain scheduling subband m, and $\alpha$ is a weighting coefficient of the scheduling result in the time-domain scheduling subframe n.

The value $Q_i(n,m)$ includes following cases:

$$Q_i(n,m) = \begin{cases} 1. & \text{where the user terminal is scheduled and } i \\ & \text{other user terminals are scheduled} \\ & \text{simultaneously} \\ 0. & \text{where the user terminal is scheduled and} \\ & \text{the number of other user terminals} \\ & \text{scheduled simultaneously is not } i, \text{ or} \\ & \text{where the user terminal is not scheduled.} \end{cases}$$

When the base station performs multi-user multiple-input multiple-output scheduling based on the MU CQIs fed back from the one or plural user terminals, the base station obtains an MU CQI for each hypothetical interference number in each frequency-domain scheduling subband and in each time-domain scheduling subframe by performing time-frequency interpolation on the MU CQIs fed back from the one or plural user terminals, and uses the MU CQI in the multi-user multiple-input multiple-output scheduling.

In selecting the first feedback template for the user terminal, the base station selects the first feedback template for a corresponding user terminal based on a maximum number of schedulable users, a signal to interference noise ratio of each user terminal and/or channel spatial characteristics.

In the user terminal and/or the base station, a group of feedback templates including one or a plurality of feedback templates is set in advance, in each of the feedback templates, one feedback ratio of MU CQIs of hypothetical interference numbers k is defined, k being an integer larger than 0 and smaller than a maximum number of users schedulable by the base station, and the user terminal and/or the base station selects the first feedback template or the second feedback template from the group of feedback templates.

In each of the feedback templates, one feedback ratio of single user channel quality (SU CQI) and the MU CQIs of the respective hypothetical interference numbers k is further defined.

In each of the feedback templates, one feedback order of the MU CQIs of the respective hypothetical interference numbers k in time-domain feedback subframes and/or frequency-domain feedback subbands is further defined.

Further, the present invention provides a user terminal.

The user terminal comprising: a storing module configured to store a group of feedback templates including one or a plurality of feedback templates, each of the feedback templates having defined therein a feedback ratio of multi-user channel quality (MU CQIs) of a plurality of hypothetical interference numbers k, and k being an integer larger than 0 and smaller than a maximum number of users schedulable by a base station that has control over the user terminal; and an MU CQI determining module configured to select one feedback template from the group of feedback templates, calculate MU CQIs based on the feedback template selected, and feeding back the MU CQIs calculated.

The MU CQI determining module calculates the MU CQIs of the respective hypothetical interference numbers k defined in the feedback template selected, and transmits the MU CQIs to the base station that has control over the user terminal, in time and/or frequency based on the feedback ratio.

When P time-domain feedback subframes being set as one time cycle, the MU CQI determining module determines a number of time-domain feedback subframes occupied by an MU CQI of each of the hypothetical interference numbers k based on the feedback ratio and in each time cycle, the MU CQI determining module transmits the MU CQI of the hypothetical interference number k using a corresponding number of time-domain feedback subframes.

When a frequency bandwidth of the mobile communication system is divided into M frequency-domain feedback subbands, the MU CQI determining module determines a number of frequency-domain feedback subbands occupied by an MU CQI of each of the hypothetical interference numbers k based on the feedback ratio and transmits the MU CQI of the hypothetical interference number k using a corresponding number of frequency-domain feedback subbands.

When a frequency bandwidth of the mobile communication system is divided into M frequency-domain feedback subbands and P time-domain feedback subframes is set as one time cycle, the MU CQI determining module determines a number of pairs of a time-domain feedback subframe and a frequency-domain feedback subband occupied by an MU CQI of each of the hypothetical interference numbers k based on the feedback ratio, and transmits the MU CQI of the hypothetical interference number k using a corresponding number of pairs of the time-domain feedback subframe and the frequency-domain feedback subband.

In each of the feedback templates, one feedback order of the MU CQIs of the respective hypothetical interference numbers k in time-domain feedback subframes and/or frequency-domain feedback subbands is further defined.

The MU CQI determining module selects the one feedback template from the group of feedback templates based on a notification from the base station or a signal to interference noise ratio of the user terminal, and calculates the MU CQIs based on the feedback template selected.

Furthermore, the present invention provides a base station.

The base station comprising: a storing module configured to store a group of feedback templates including one or a plurality of feedback templates, each of the feedback templates having defined therein a feedback ratio of multi-user channel quality (MU CQIs) of a plurality of hypothetical interference numbers k, and k being an integer larger than 0 and smaller than a maximum number of users schedulable by the base station; and a feedback template determining module configured to select, from the group of feedback templates, a first feedback template for a user terminal under control of the base station and notifies the user terminal of the first feedback template.

The feedback template determining modules performs multi-user multiple-input multiple-output scheduling based on MU CQIs fed back from one or plural user terminals, and determines the first feedback template for the user terminal based on an actual scheduling result.

The feedback template determining modules determines a number i of other users scheduled simultaneously with the user terminal in a pre-set history time window, determines a probability of occurrence of the number i of other users in the history time window and determines the first feedback template based on the probability of occurrence.

The feedback template determining modules selects the first feedback template for a corresponding user terminal based on a maximum number of schedulable users, a signal to interference noise ratio of each user terminal and/or channel spatial characteristics.

In each of the feedback templates, one feedback order of the MU CQIs of the respective hypothetical interference numbers k in time-domain feedback subframes and/or frequency-domain feedback subbands is defined.

DESCRIPTION OF EMBODIMENTS

In order to further clarify an objective, solving means and merits of the present invention, the present invention will be described in detail below, with reference to the drawings and by way of embodiments.

In an embodiment of the present invention, there is provided a method for determining a MU CQI. In order to reduce feedback overhead, a UE apparatus feeds back various MU CQIs in a multiplexed manner in uplink time-domain feedback subframes and/or frequency-domain feedback subbands. For example, polling multiplexing feedback or weighting polling multiplexing feedback may be employed.

Specifically, in the weighting polling multiplexing feedback system, a MU CQI feedback ratio of each hypothetic interference number per UE apparatus coincides with or approximately coincides with the probability of occurrence of number of other users scheduled simultaneously which are calculated for the UE apparatus in one history time window. Here, the number of other users scheduled simultaneously with the UE apparatus corresponds to the interference number for the UE apparatus.

In configuring the system, a group including one or a plurality of feedback templates may be set in advance and, in each of the feedback templates, a MU CQI feedback ratio may be defined for each hypothetic interference number. An eNB apparatus may first designate the probabilities of various MU CQIs to the UE apparatus and then, the eNB apparatus and the UE apparatus may create a corresponding feedback template based on pre-set rules. As a matter to be explained, each feedback template may be applicable to the time-domain feedback subframe, frequency-domain feedback subbands or time and frequency two-dimensional area.

Figure 1:
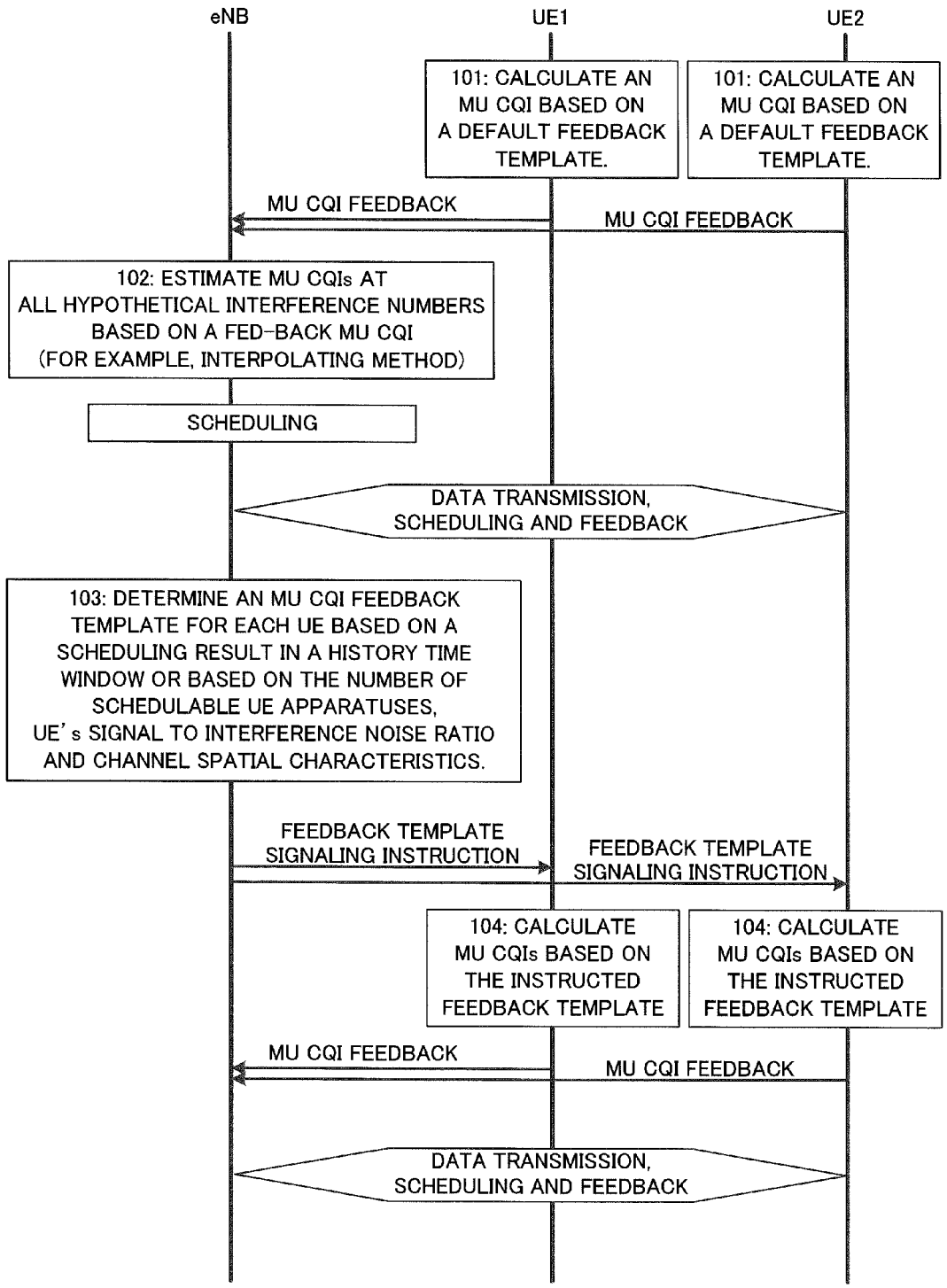
FIG. 1 is a flowchart of a method for determining an MU CQI according to one embodiment of the present invention.

FIG. 1 is a flowchart of a method for determining an MU CQI in an embodiment of the present invention, including the following steps.

In the step 101, in the early stage of communication, each UE apparatus uses a second feedback template set by itself as a basis to calculate a MU CQI in each frequency-domain feedback subband and sends it as feedback.

In the system, one or a plurality of feedback templates are defined in advance and one is selected therefrom to be used as a second feedback template. In Table 1, three feedback templates are defined illustratively. These feedback templates are created based on the weighting polling multiplexing feedback system. Here, layers of interference considered in calculation of MU CQI include first to three layers of interference, and MU CQIs that are estimated with the hypothetical interference numbers 1, 2 and 3, are r1, r2 and r3, respectively. Besides, the defined feedback templates are stored in advance in the base station and/or user terminal and one feedback template index is given for each of the feedback templates. In defining feedback templates in advance, the SU CQI (r0) that does not consider multi-user interference and various MU CQIs are arranged together to form a plurality of CQIs, which are used to design one or a plurality of feedback templates depending on the ratio.

TABLE 1

| Feedback template | | Feedback ratio of MU CQIs | | |
|---|---|---|---|---|
| index | Feedback temperate | r1 | r2 | r3 |
| 0 | r1 r2 r1 r3 | 1/2 | 1/4 | 1/4 |
| 1 | r2 r1 r2 r3 | 1/4 | 1/2 | 1/4 |
| 2 | r3 r1 r3 r2 | 1/4 | 1/4 | 1/2 |

Figure 3:
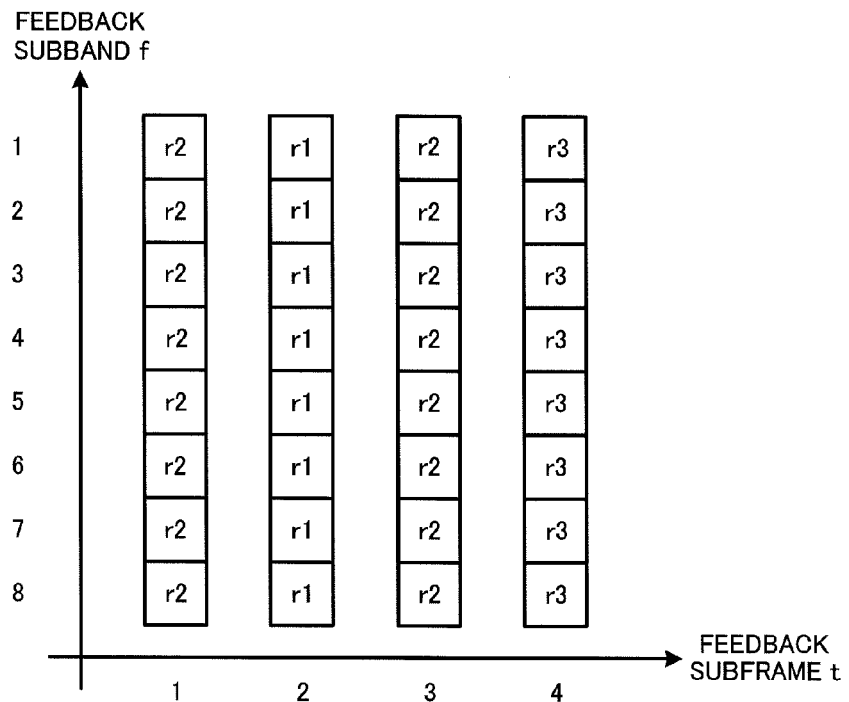
FIG. 3 is a diagram illustrating application of a feedback template to time-domain feedback subframes in an embodiment of the present invention.
Figure 4:
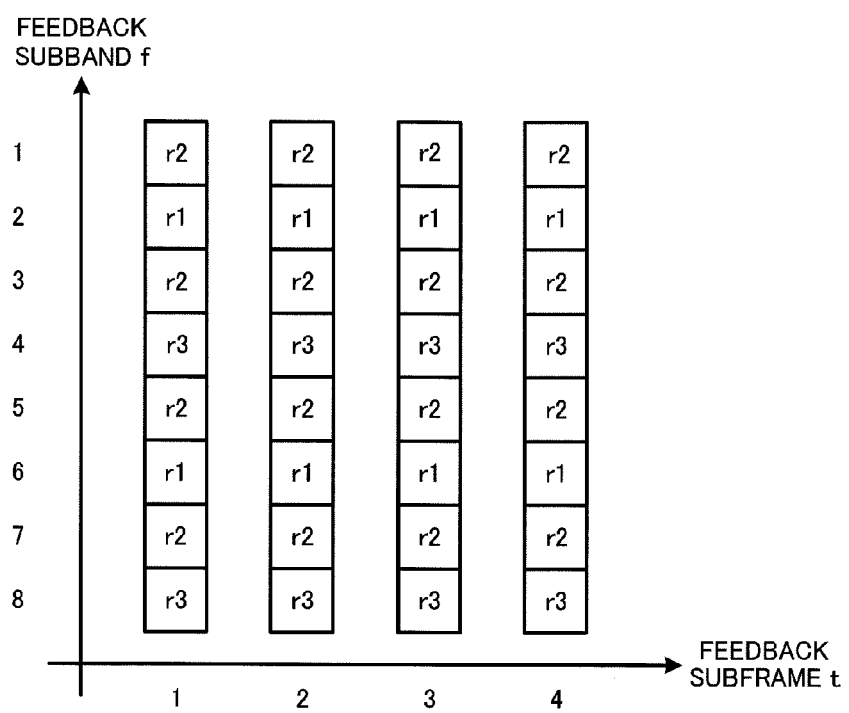
FIG. 4 is a diagram illustrating application of a feedback template to frequency-domain feedback subbands in another embodiment of the present invention.
Figure 5:
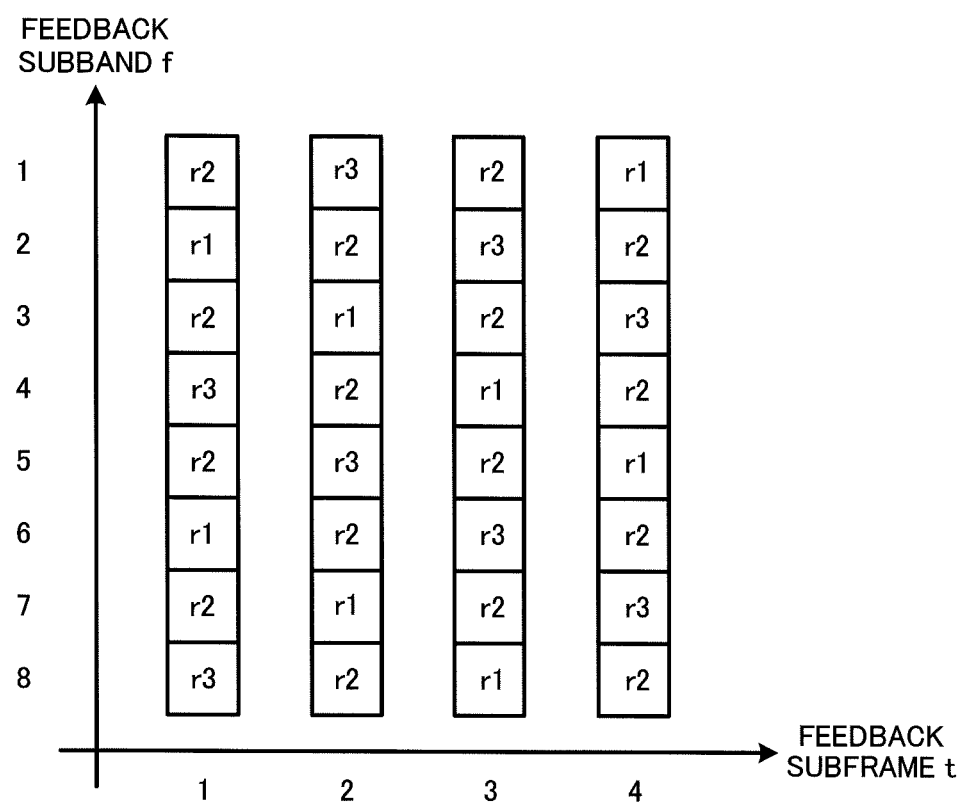
FIG. 5 is a diagram illustrating two-dimensional application of a feedback template to time-domain feedback subframes and frequency-domain feedback subbands in another embodiment of the present invention.

In a specific embodiment of the present invention, the feedback template 1 is selected to be a second feedback template. FIGS. 3, 4 and 5 illustrate the feedback template 1 being applied to a time-domain feedback subframe, a frequency-domain feedback subband or a two-dimensional domain of time and frequency. For example, as illustrated in FIG. 5, a certain user terminal feeds r2 back to the base station at the time t1 and in the frequency-domain feedback subband f1. As is clear from this, the feedback template applied to the time-frequency two-dimensional domain can provide more time-frequency diversity information of various MU CQIs. When the interference number is determined, the MU CQI estimating method is the same as that of the conventional technique and its explanation is omitted here. For example, r1, r2 and r3 can be all calculated with reference to the conventional technique.

As a matter to be explained, the second feedback template may be selected by any one of a plurality of methods, which examples are explained below:

(1) A default feedback template applicable to a large number of UE apparatuses is selected to be a second feedback template based on experience points. All the UE apparatuses use this default feedback template at the early stage.

Figure 6:
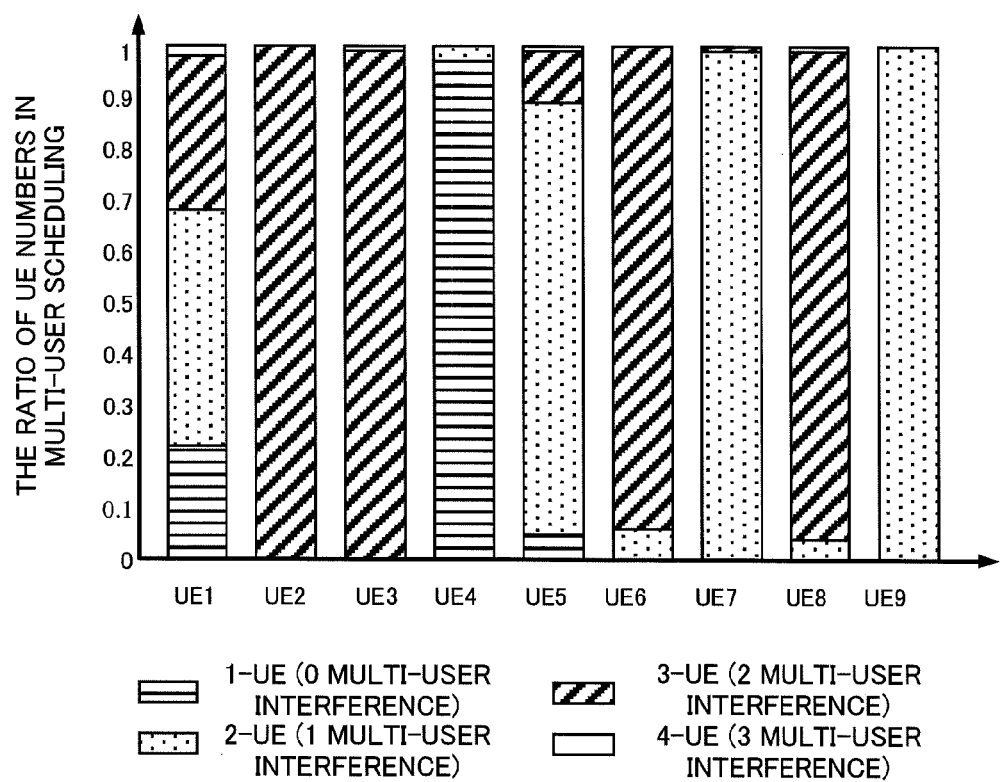
FIG. 6 is a diagram illustrating occurrence of different numbers of users in multi-user scheduling in an embodiment of the present invention.

FIG. 6 is a diagram illustrating the probability of occurrence of different numbers of users when scheduling is performed for 9 UE apparatuses. Note that antennas of each UE apparatus are arranged in a vertically equal antenna pattern, and include 4 transmission antennas and 2 reception antennas. The antenna interval is 0.5 wavelength. When the UE1 is scheduled, the number of other users that are scheduled simultaneously is 0 to 3, and that is, the multi-user interference number is 1 to 3, respectively. Here, the case where the multi-user interference number 1 occupies most. As is clear from the scheduling statistical results, there are five UE apparatuses, UE1, UE4, UE5, UE7 and UE9, that select the feedback template 0, and there are four UE apparatuses, UE2, UE3, UE6 and UE8, that select the feedback template 1. Accordingly, the feedback template 0 is selected to be a default feedback template of the system. In a specific embodiment, different default feedback templates may be selected depending on different system environments and antenna patterns.

(2) A UE characteristic is used as a basis to set a second feedback template corresponding to each UE apparatus. According to general experiences, MU-MIMO is generally applied to a UE apparatus of high signal to interference noise ratio and SU-MIMO is applied to a UE apparatus of low signal to interference noise ratio. In this way, the UE apparatus of high signal to interference noise ratio is configured to use the feedback template 2 selected as the second feedback template, while the UE of low signal to interference noise ratio is configured to use the feedback template 0 selected as the second feedback template. In this case, the eNB apparatus and/or the UE apparatus needs to recognize the signal to interference noise ratio of the UE. For example, the eNB apparatus can recognize the ratio from reference signal reception quality (RSRQ) and reference signal reception power (RSRP) reported from the UE apparatus or other information where the signal to interference noise ratio of the UE is reflected. Specifically, in the system, a first threshold may be determined for these information pieces where the signal to interference noise ratio of the UE is reflected in order to select the second feedback template. When the signal to interference noise ratio is larger than the first threshold, the feedback rate of MU CQI of any relatively large hypothetical interference number k is relatively large in the selected second feedback template. For example, in this case, the feedback rate at the hypothetical interference number 3 is 60%, which is greater than the feedback rate of the hypothetical interference number 1 and/or 2. When the signal to interference noise ratio is lower than the first threshold, the feedback rate of MU CQI of any relatively small hypothetical interference number k is relatively large. Needless to say, the correspondence between the range of signal to interference noise ratio and second feedback template may be determined. Both of the eNB and UE apparatuses recognize the correspondence. An actual signal to interference noise ratio of a certain UE apparatus fall within a certain range, a second feedback template in correspondence with this range is used to send an MU CQI as feedback.

At the step 102, the eNB apparatus uses the MU CQI sent from the UE apparatus as a basis to obtain an MU CQI for each hypothetical interference number in each frequency-domain scheduling subband and each time-domain scheduling subframe by time-frequency interpolating method or any other method, and the eNB apparatus uses obtained MU CQIs to complete multi-user scheduling.

As the step 103, the eNB apparatus takes statistics of scheduling results of each UE apparatus within a pre-set history time window and obtains the probability of occurrence of numbers of other users that are scheduled simultaneously. Then, it selects a first feedback template that is most appropriate or close to the probability of occurrence and reports a corresponding feedback template index to the UE apparatus by downlink signaling.

At this step, the eNB takes statistics of scheduling results of each UE by any of plural methods, which are given below:

(1) The eNB apparatus directly accumulates the number $w_i$ (i=1, 2, 3) of occurrence of the number i of users that are scheduled simultaneously with the UE in a history time window and thereby obtains the ratio $w_1:w_2:w_3$ of the numbers i of other users that are scheduled simultaneously with the UE.

(2) As the time of the scheduling results is closer to the current time, more weight is placed on the scheduling results in taking statistics of the probability of occurrence of the number of other users scheduled simultaneously. When a slide window is applied, an expression to calculate the weighting ratio of certain UE is given below:

$$w_i(n) = (1-\alpha)w_i(n-1) + \alpha \cdot \Sigma_m Q_i(n,m), \quad \text{[FORMULA 2]}$$

Here, $w_i(n)$ is a weighting ratio (i=1, 2, 3) of other UE apparatuses in number i that are scheduled simultaneously with the UE apparatus in all frequency-domain scheduling subbands at a downlink time-domain scheduling subframe n, $Q_i(n,m)$ is a scheduling result at the time-domain scheduling subframe n and the frequency-domain scheduling subband m, and $\alpha$ is a weighting coefficient of the scheduling result at the time-domain scheduling subframe n and is used to reflect occupation of the closest scheduling result in the weighting ratio. In the corresponding manner, the ratio of the numbers of other users that are scheduled simultaneously is given below: $w_1(n):w_2(n):w_3(n)$ In a specific embodiment of the present invention, the following cases are considered.

$$Q_i(n, m) = \begin{cases} 1. & \text{Where the } UE \text{ apparatus is scheduled and } i \\ & \text{other } UE \text{ apparatuses are scheduled} \\ & \text{simultaneously.} \\ 0. & \text{Where the } UE \text{ apparatus is scheduled and} \\ & \text{the number of other } UE \text{ apparatuses} \\ & \text{scheduled simultaneously is not } i, \text{ or} \\ & \text{where the } UE \text{ apparatus is not scheduled.} \end{cases}$$

In this way, only by finding out the number of other users scheduled simultaneously which number shows a maximum probability of occurrence, it is possible to select a corresponding feedback template from a group of feedback templates defined in the table 1. The feedback rate of the corresponding hypothetical interference number in the feedback template is maximized.

At the step 103, the eNB apparatus may use the maximum number of schedulable users and the signal to interference noise ratio (SINR) of each user terminal and/or channel spatial characteristic as a basis to select a first feedback template for a corresponding user terminal and notifies the corresponding user terminal by signaling. For an illustrative example, the channel spatial characteristic may be parameters such as channel correlation, an angle of arrival, an angle of departure and so on. For example, when SINR is greater than the second threshold and the maximum number of schedulable users is relatively great, in a selected first feedback template, the feedback rate of MU CQI of any relatively large hypothetical interference number k is relatively large. When SINR is lower than the second threshold and the maximum number of schedulable users is relatively small, in a selected first feedback template, the feedback ratio of MU CQI of any relatively small hypothetical interference number k is relatively large.

At the step 104, the UE apparatus uses the directed feedback template determined by the eNB apparatus as a basis to calculate an MU CQI in each frequency-domain feedback subband and sends it as feedback.

Specifically, after receiving the feedback template index, the UE apparatus searches the group of feedback templates stored in the apparatus and uses the selected directed feedback template as a basis to feed back an MU CQI at each hypothetical interference number in each time-domain feedback subframe, each frequency-domain feedback subband or each two-dimensional domain of time and frequency.

As is clear from this, by feeding back MU CQIs for the respective hypothetical interference numbers, it is possible to provide more accurate MU CQI information to the eNB apparatus. With this structure, it is possible to increase the multi-user scheduling accuracy and improve the system performance.

In the flow illustrated in FIG. 1 mentioned above, at the step 101 and the step 102, the early stage of adopting the second feedback template, calculating MU CQIs and feeding back them is selectable. For example, it may be configured that the eNB apparatus uses, as a basis, an MU CQI or SU CQI fed back from the UE apparatus in the conventional technique to perform multi-user scheduling, and then, provides the UE apparatus with instructions of a feedback template based on an actual scheduling result, and the UE apparatus uses the instructed feedback template as a basis to feed back MU CQIs again. As a matter to be explained, there are a plurality of communications between the base station and a UE apparatus under control of the base station. Every communication may include operations such as data transmission, scheduling and MU CQI feedback. Before receiving a signaling instruction of a new feedback template from the base station, the UE apparatus feeds back MU CQIs based on the first feedback template that has been instructed before or the second feedback template set by the UE apparatus itself.

Figure 2:
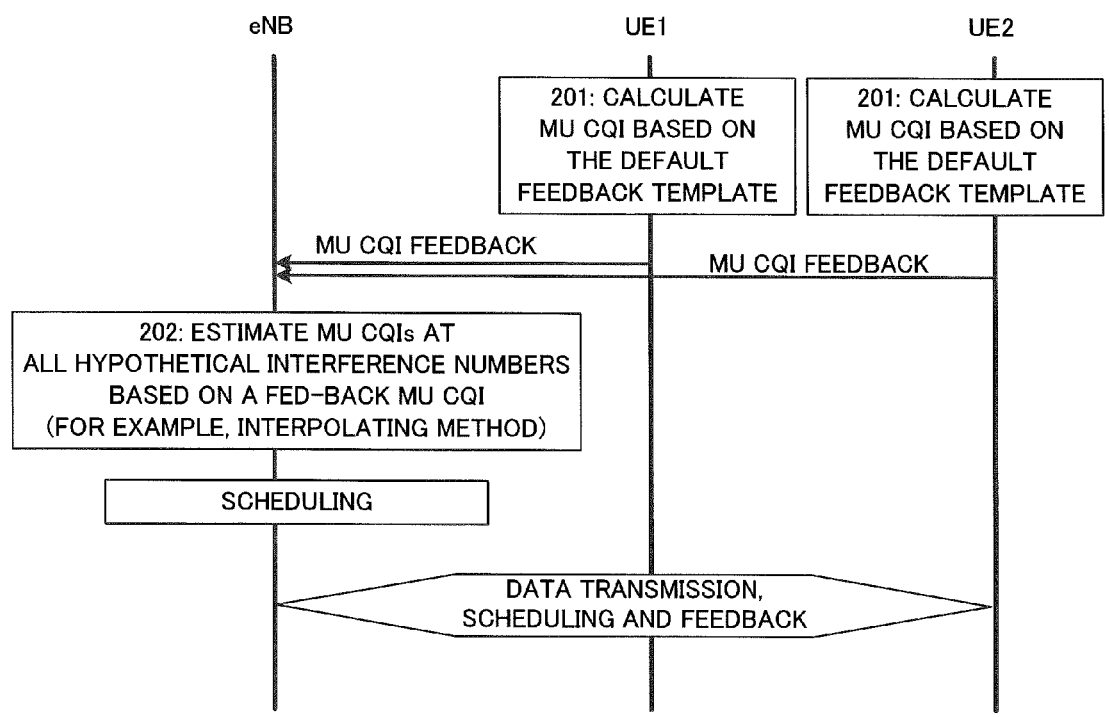
FIG. 2 is a flowchart of a method for determining an MU CQI according to another embodiment of the present invention.

In another embodiment of the present invention illustrated in FIG. 2, the UE apparatus calculates and feeds back MU CQIs all the time based on the second feedback template. For example, the UE apparatus uses its own SINR as a basis to select the second feedback template and uses the selected second feedback template as a basis to feed back MU CQIs. This flow is analogue to the processing at the steps 101 and 102. Thus, the eNB apparatus needs not to report the feedback template to the UE apparatus by signaling. This makes it possible to prevent any increase in signaling overhead.

At the step 201, each UE apparatus uses the second feedback template set by itself as a basis to calculate and feed back MU CQIs. Specifically, every time when it feeds back MU CQIs, the user terminal compares its own current signal to interference noise ratio with the first threshold. When the signal to interference noise ratio is higher than the first threshold, in the selected second feedback template, the feedback rate of MU CQI of any relatively large hypothetical interference number k is relatively large. When the signal to interference noise ratio is lower than the first threshold, in the selected second feedback template, the feedback rate of MU CQI of any relatively small hypothetical interference number k is relatively large. Here, in the second feedback template, the feedback rates of MU CQIs for a plurality of hypothetical interference numbers k are defined. The number k is an integer greater than 0 and smaller than the maximum number of users that are schedulable by the base station.

At the step 202, the eNB apparatus uses MU CQIs fed back from the UE apparatus as a basis to obtain MU CQIs at respective hypothetical interference numbers k in respective time-domain scheduling subframes and frequency-domain scheduling subbands by time-frequency interpolation or any other method, and uses these MU CQIs as a basis to complete multi-user scheduling. In this way, one communication between the UE apparatus and the base station is completed. Needless to say, a plurality of communications may be performed between the UE apparatus and the base station and explanation thereof is omitted here.

In another embodiment of the present invention, the UE apparatus determines whether it have received a signaling notification about a feedback template from the base station or not. When it has received the signaling notification, the UE apparatus adopts the first feedback template notified from the base station to calculate and feed back MU CQIs, while when it has not received the signaling notification, the UE apparatus adopts the second feedback template set by itself to calculate and feed back MU CQIs.

Further, the present invention also provides a user terminal.

The user terminal has a storing module configure to store a group including one or more feedback templates. Here, in each of the feedback templates, there is defined one feedback ratio of multi-user channel quality (MU CQIs) at plural hypothetical interference numbers k, and k is an integer greater than 0 and smaller than the maximum number of users schedulable by the base station. It further has an MU CQI determining module configured to select a first feedback template from the group of feedback templates, calculate MU CQIs based on the first feedback template and feed back the calculated MU CQIs.

Note that the MU CQI determining module calculates MU CQIs at respective hypothetical interference numbers k defined in the first feedback template and uses the feedback rate as a basis to transmit the calculated MU CQIs in time and/or frequency to the base station that controls the user terminal.

Specifically, the MU CQI determining module uses time-domain feedback subframes in number P as one time cycle and uses the feedback rate as a basis to determine the number of time-domain feedback subframes occupied by an MU CQI of each of the hypothetical interference numbers k and uses a corresponding number of time-domain feedback subframes in each time cycle and transmits the MU CQI of the hypothetical interference number k.

More specifically, the MU CQI determining module divides a frequency bandwidth of the mobile communication system into M frequency-domain feedback subbands and uses the feedback rate as a basis to determine the number of frequency-domain feedback subbands occupied by an MU CQI of each of the hypothetical interference numbers k and uses a corresponding number of frequency-domain feedback subbands and transmits the MU CQI of the hypothetical interference number k.

More specifically, the MU CQI determining module divides the frequency bandwidth of the mobile communication system into M frequency-domain feedback subbands, uses P time-domain feedback subframes as one time cycle, and uses the feedback rate as a basis to determine the number of pairs of a frequency-domain feedback subband and a time-domain feedback subframe occupied by an MU CQI of each of the respective hypothetical interference numbers k. Then, it uses a corresponding number of pairs of a frequency-domain feedback subband and a time-domain feedback subframe to transmit the MU CQI of the hypothetical interference number k.

Preferably, in each of the feedback templates, one feedback order is defined in the time-domain feedback subframe and/or frequency-domain feedback subband of MU CQI at the plural hypothetical interference numbers k.

Further, the MU CQI determining module selects one feedback template from a group of feedback templates based on its own setting or a notification from the base station and calculates MU CQIs based on the selected feedback template.

As a matter to be explained, whichever is selected, setting by itself or notification from the base station, the base station can recognize what feedback template is adopted by the user terminal. With this structure, the base station is assured to be able to extract MU CQIs at respective hypothetical interference numbers k more accurately.

Furthermore, the present invention also provides a base station.

The base station has a storing module configured to store a group including one or more feedback templates. In each of the feedback templates, one feedback ratio of multi-user channel quality (MU CQIs) of plural hypothetical interference numbers k is defined, and k is an integer greater than 0 and smaller than the maximum number of users schedulable by the base station. The base station also has a feedback template determining module configured to select a first feedback template for the user terminal from the group of feedback templates based on an actual scheduling result of user terminal and notify the corresponding user terminal.

In each of the feedback templates, one feedback order is further defined in the time-domain feedback subframes and/or frequency-domain feedback subbands of MU CQIs at plural hypothetical interference numbers k.

Note that the feedback template determining modules determines the number i of other users scheduled simultaneously with the user terminal in a pre-set history time window, determines the probability of occurrence of each number i of users in the history time window, and determines the first feedback template based on the probability of occurrence.

Further, the feedback template determining module uses the maximum number of schedulable users and the signal to interference noise ratio of each user terminal and/or channel spatial characteristic as a basis to select the first feedback template of the corresponding user terminal.

The preferable embodiments of the present invention described up to this point have been provided for illustrative purposes only and are not intended to limit the scope of the present invention. It should be noted that various modifications, equivalent replacement and improvements made in the spirit and principle of the present invention fall within the scope of the present invention.

The disclosure of Chinese Patent Application No. 201110111665.6, filed on Apr. 22, 2011, including the specification, drawings, and abstract, is incorporated herein by reference in its entirety.

The invention claimed is:

1. A method for determining multi-user channel quality (MU CQIs) in a mobile communication system, the method comprising the steps of:
   in each user terminal, calculating the MU CQIs based on a first feedback template notified from a base station that has control over the user terminal or a second feedback template set by the user terminal and feeding the MU CQIs back to the base station,
   wherein in the first feedback template or the second feedback template used in calculation of the MU CQIs, a plurality of hypothetical interference numbers k and a feedback ratio of MU CQIs for the plurality of hypothetical interference numbers k are defined, k being an integer larger than 0 and smaller than a maximum number of users schedulable by the base station,
   the user terminal calculates the MU CQIs based on the second feedback template set by the user terminal and feeds the MU CQIs back to the base station, and
   the base station uses MU CQIs fed back from one or more user terminals as a basis to perform multi-user multiple-input multiple-output scheduling, and selects the first feedback template for the user terminal.

2. The method of claim 1, wherein, in the step of, in the user terminal, calculating the MU CQIs and feeding the MU CQIs back to the base station, the user terminal calculates the MU CQIs for the respective hypothetical interference numbers k defined in the first feedback template or the second feedback template and feeds the MU CQIs back to the base station in time and/or frequency based on the feedback ratio.

3. The method of claim 2, wherein, in transmitting the MU CQIs in the time and/or frequency based on the feedback ratio, P time-domain feedback subframes is set as one time cycle, a number of time-domain feedback subframes occupied by an MU CQI of each of the hypothetical interference numbers k is determined based on the feedback ratio, and in each time cycle, the MU CQI of the hypothetical interference number k is transmitted using a corresponding number of time-domain feedback subframes.

4. The method of claim 2, wherein, in transmitting the MU CQIs in the time and/or frequency based on the feedback ratio, a frequency bandwidth of the mobile communication system is divided into M frequency-domain feedback subbands, a number of frequency-domain feedback subbands occupied by an MU CQI of each of the hypothetical interference numbers k is determined based on the feedback ratio, and the MU CQI of the hypothetical interference number k is transmitted using a corresponding number of frequency-domain feedback subbands.

5. The method of claim 2, wherein, in transmitting the MU CQIs in the time and/or frequency based on the feedback ratio, a frequency bandwidth of the mobile communication system is divided into M frequency-domain feedback subbands, P time-domain feedback subframes is set as one time cycle, a number of pairs of a time-domain feedback subframe and a frequency-domain feedback subband occupied by an MU CQI of each of the hypothetical interference numbers k is determined based on the feedback ratio, and the MU CQI of the hypothetical interference number k is transmitted using a corresponding number of pairs of the time-domain feedback subframe and the frequency-domain feedback subband.

6. The method of claim 1, wherein the user terminals under control of the base station use a same second feedback template.

7. The method of claim 1, wherein the user terminal selects the second feedback template based on a current signal to interference noise ratio of the user terminal in feeding back the MU CQIs, when the signal to interference noise ratio is larger than a first threshold, a feedback rate of an MU CQI of any relatively large hypothetical interference number k is relatively large in the selected second feedback template, and when the signal to interference noise ratio is smaller than the first threshold, a feedback rate of an MU CQI of any relatively small hypothetical interference number k is relatively large in the selected second feedback template.

8. The method of claim 1, wherein, in selecting the first feedback template for the user terminal, the base station determines a number i of other users scheduled simultaneously with the user terminal in a pre-set history time window, determines a probability of occurrence of the number i of other users scheduled simultaneously in the history time window and determines the first feedback template based on the probability of occurrence.

9. The method of claim 8, wherein the probability of occurrence of the number i of other users scheduled simultaneously in the history time window is determined by accumulating occurrence frequencies of the number i of other users scheduled simultaneously in the history time window, or by determining a weighing ratio $w_i(n)$ of the number i of other users scheduled simultaneously in a time-domain scheduling subframe n based on an expression:

$$w_i(n)=(1-\alpha)w_i(n-1)+\alpha \cdot \Sigma_m Q_i(n,m), \quad \text{[FORMULA 1]}$$

where $Q_i(n,m)$ is a scheduling result in the time-domain scheduling subframe n and a frequency-domain scheduling subband m, and $\alpha$ is a weighting coefficient of the scheduling result in the time-domain scheduling subframe n.

10. The method of claim 9, wherein the value $Q_i(n,m)$ includes following cases:

$$Q_i(n,m) = \begin{cases} 1. & \text{where the user terminal is scheduled and } i \text{ other user terminals are scheduled simultaneously} \\ 0. & \text{where the user terminal is scheduled and the number of other user terminals scheduled simultaneously is not } i, \text{ or where the user terminal is not scheduled.} \end{cases}$$

11. The method of claim 1, wherein, when the base station performs multi-user multiple-input multiple-output scheduling based on the MU CQIs fed back from the one or more user terminals, the base station obtains an MU CQI for each hypothetical interference number in each frequency-domain scheduling subband and in each time-domain scheduling subframe by performing time-frequency interpolation on the MU CQIs fed back from the one or more user terminals, and uses the MU CQI in the multi-user multiple-input multiple-output scheduling.

12. The method of claim 1, wherein, in selecting the first feedback template for the user terminal, the base station selects the first feedback template for a corresponding user terminal based on a maximum number of schedulable users, a signal to interference noise ratio of each user terminal and/or channel spatial characteristics.

13. The method of claim 1, wherein
in the user terminal and/or the base station, a group of feedback templates including one or a plurality of feedback templates is set in advance, in each of the feedback templates, one feedback ratio of MU CQIs of hypothetical interference numbers k is defined, k being an integer larger than 0 and smaller than a maximum number of users schedulable by the base station, and
the user terminal and/or the base station selects the first feedback template or the second feedback template from the group of feedback templates.

14. The method of claim 13, wherein in each of the feedback templates, one feedback ratio of single user channel quality (SU CQI) and the MU CQIs of the respective hypothetical interference numbers k is further defined.

15. The method of claim 13, wherein in each of the feedback templates, one feedback order of the MU CQIs of the respective hypothetical interference numbers k in time-domain feedback subframes and/or frequency-domain feedback subbands is further defined.

16. A user terminal comprising a processor operatively coupled to a memory, wherein the memory comprises executable instructions that cause the processor to perform the steps of:
storing a group of feedback templates including one or a plurality of feedback templates, each of the feedback templates having defined therein a plurality of hypothetical interference numbers k and a feedback ratio of multi-user channel quality (MU CQIs) for the plurality of hypothetical interference numbers k, and k being an integer larger than 0 and smaller than a maximum number of users schedulable by a base station that has control over the user terminal; and
selecting one feedback template from the group of feedback templates based on a first feedback template notified from the base station or a second feedback template set by the user terminal, calculate MU CQIs based on the second feedback template selected by the user terminal, and feeding back the MU CQIs to the base station, wherein the base station uses MU CQIs fed back from one or more user terminals as a basis to perform multi-user multiple-output scheduling, and selects the first feedback template for the user terminal.

17. The user terminal of claim 16, wherein the processor calculates the MU CQIs of the respective hypothetical interference numbers k defined in the feedback template selected, and transmits the MU CQIs to the base station that has control over the user terminal, in time and/or frequency based on the feedback ratio.

18. The user terminal of claim 17, wherein, when P time-domain feedback subframes being set as one time cycle, the processor determines a number of time-domain feedback subframes occupied by an MU CQI of each of the hypothetical interference numbers k based on the feedback ratio and in each time cycle, the processor transmits the MU CQI of the hypothetical interference number k using a corresponding number of time-domain feedback subframes.

19. The user terminal of claim 17, wherein, when a frequency bandwidth of the mobile communication system is divided into M frequency-domain feedback subbands, the processor determines a number of frequency-domain feedback subbands occupied by an MU CQI of each of the hypothetical interference numbers k based on the feedback ratio and transmits the MU CQI of the hypothetical interference number k using a corresponding number of frequency-domain feedback subbands.

20. The user terminal of claim 17, wherein, when a frequency bandwidth of the mobile communication system is divided into M frequency-domain feedback subbands and P time-domain feedback subframes is set as one time cycle, the processor determines a number of pairs of a time-domain feedback subframe and a frequency-domain feedback subband occupied by an MU CQI of each of the hypothetical interference numbers k based on the feedback ratio, and transmits the MU CQI of the hypothetical interference number k using a corresponding number of pairs of the time-domain feedback subframe and the frequency-domain feedback subband.

21. The user terminal of claim 16, wherein in each of the feedback templates, one feedback order of the MU CQIs of the respective hypothetical interference numbers k in time-domain feedback subframes and/or frequency-domain feedback subbands is further defined.

22. The user terminal of claim 16, wherein the processor selects the one feedback template from the group of feedback templates based on a notification from the base station or a signal to interference noise ratio of the user terminal, and calculates the MU CQIs based on the feedback template selected.

23. A base station comprising a processor operatively coupled to a memory, wherein the memory comprises executable instructions that cause the processor to perform the steps of:
storing a group of feedback templates including one or a plurality of feedback templates, each of the feedback templates having defined therein a plurality of hypothetical interference numbers k and a feedback ratio of multi-user channel quality (MU CQIs) for the plurality of hypothetical interference numbers k, and k being an integer larger than 0 and smaller than a maximum number of users schedulable by the base station that has control over a user terminal, the user terminal calculates MU CQIs based on a second feedback template set by the user terminal, and feeds back the MU CQIs to the base station; and
selecting, from the group of feedback templates, a feedback template for the user terminal, wherein the base station uses MU CQIs fed back from one or more user terminals as a basis to perform multi-user multiple-output scheduling, selects the first feedback template for the user terminal, and notifies the user terminal of the first feedback template.

24. The base station of claim 23, wherein the processor determines a number i of other users scheduled simultaneously with the user terminal in a pre-set history time window, determines a probability of occurrence of the number i of other users in the history time window and determines the first feedback template based on the probability of occurrence.

25. The base station of claim 23, wherein the processor selects the first feedback template for a corresponding user terminal based on a maximum number of schedulable users, a signal to interference noise ratio of each user terminal and/or channel spatial characteristics.

26. The base station of claim 23, wherein in each of the feedback templates, one feedback order of the MU CQIs of the respective hypothetical interference numbers k in time-domain feedback subframes and/or frequency-domain feedback subbands is defined.

* * * * *